March 9, 1965 E. S. GREINER ETAL 3,172,858

PREPARATION OF SILICON RIBBONS

Filed Jan. 11, 1963

INVENTORS E. S. GREINER
J. A. GUTOWSKI

BY Edward M. Fink

ATTORNEY 3,172,858

PREPARATION OF SILICON RIBBONS

Earl S. Greiner, Short Hills, and Joseph A. Gutowski, Linden, N.J., assignors to Bell Telephone Laboratories, Incorporated, New York, N.Y., a corporation of New York Filed Jan. 11, 1963, Ser. No. 250,903
6 Claims. (Cl. 252—62.3)

This application is a continuation-in-part of our copending application Serial No. 146,653, filed October 20, 1961, now abandoned, which is a continuation-in-part of our copending application Serial No. 116,075 filed June 6, 1961, now abandoned, and relates to a method for the preparation of silicon ribbons of particular interest for use in semiconductor devices.

There are two classes of semiconductor devices which are of interest at the present time. The first class comprises the normal junction devices such as conventional rectifiers, transistors and the like. These devices utilize semiconductor systems such as germanium, silicon, or any of the Group III–V or II–VI compounds and typically contain of the order of $10^{16}$ atoms per cubic centimeter of uncompensated significant impurity. Such systems as well as crystallization procedures appropriately utilized for such preparations are well known.

The second class of devices is based on internal emission and operates on the tunnel principle. Such devices include the backward diode and, most lately, the Esaki diode. Most efficient operation of these devices requires very short junction depth to increase the statistical likelihood of tunnelling and permit observation of the negative resistance characteristic. Such junction characteristics are most easily obtained by use of degenerate or near degenerate semiconductor materials, typically containing an impurity content of $10^{18}$ atoms per cubic centimeter or greater.

Figure 1:
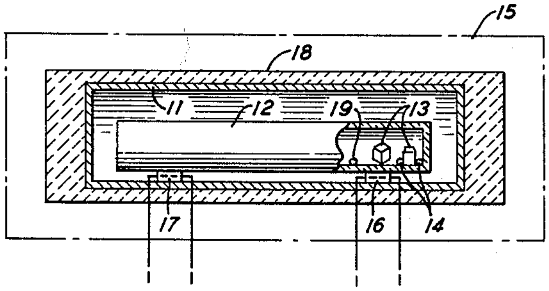
Figure 2:
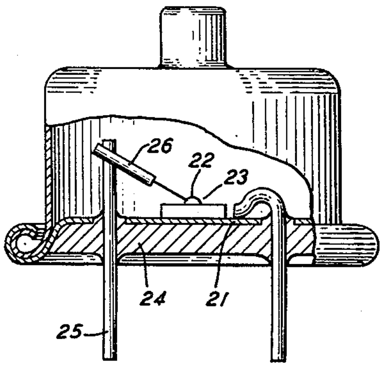

In accordance with this invention, a technique is described for the preparation of silicon ribbons (a filamentary growth containing two parallel faces and having a rectangular cross section in which the width is greater than the thickness) by reacting arsenic or boron-doped silicon pellets with hydrogen and iodine at elevated temperatures. Utilizing the inventive technique discussed herein, there is produced a flat silicon body typically having a maximum carrier concentration of the order of $4\times10^{19}$ atoms cm.$^{-3}$ and values ranging down to about $3.5\times10^{16}$ atoms cm.$^{-3}$. The present inventive technique is uniquely adapted to the preparation of materials suitable for use in both types of the above-noted devices although more suitable for the growth of low resistivity materials utilized in the latter class. The objects of the invention will be more fully understood from the description of the invention, which will be made with reference to the accompanying drawing, forming a part of the specification and wherein:

FIG. 1 is a schematic front elevational view partly in section of suitable apparatus employed in preparing silicon ribbons in accordance with the present invention; and FIG. 2 is a front elevational view partly in section of an Esaki diode utilizing a silicon ribbon prepared in accordance with the present inventive technique.

Referring more particularly to FIG. 1, there is shown an Alundum tube 11 in which there is inserted a transparent quartz tube 12 containing cubes of, for example, arsenic-doped silicon 13 and iodine pellets 14 containing nickel diiodide as separate pellets 19 or within pellets 14. Alundum tube 11 is shown inserted in cylindrical electrical resistance furnace 15 which is maintained at 1100° C. at the end contiguous to the source silicon, and at 800° C. at the other end by themocouples 16 and 17, respectively. Asbestos packing 18 is used as a thermal insulator to avoid dissipation of heat.

An exemplary procedure for preparing silicon ribbons according to the present inventive technique is as follows:

Quartz tube 12 is cleaned, for example, with a 10 percent solution of hydrogen fluoride or, in the alternative, with a mixture of nitric and hydrochloric acids. Following the acid bath, the tube is rinsed in deionized water and dried in air.

Next, arsenic-doped silicon cubes 13, typically of the order of ⅛ inch on an edge and having a resistivity within the range of 0.001 to 0.005 ohm-centimeter and higher are inserted into quartz tube 12 (20 mm. I.D., 26 cm. long, ca. 80 cm.$^3$ volume) together with a weighed amount of pellets of iodine 14 which will yield an initial partial pressure of iodine at 950° C. within the range of 1.76 to 3.1 atmospheres and at least one diiodide selected from among copper, manganese, silver, cadmium and nickel within the range of 0.001 to 0.3 percent by weight of the total iodide in the system (introduced in pellet form).

Quartz tube 12 is then evacuated, by means of an ion diffusion pump, to a pressure of the order of $10^{-5}$ millimeters of mercury. In order to minimize the loss of iodine during the evacuation step, quartz tube 12 is heated moderately. An alternative procedure for attaining this end consists of heating one-half of quartz tube 12 at a temperature within the range of 200 to 400° C. while keeping the iodine relatively cool in the other half of the tube, and then moving the iodine pellets to the outgassed portion when it cools and heating the other half of the tube at a temperature of 200 to 400° C. Next, following evacuation and outgassing, hydrogen is admitted into quartz tube 12 in an amount such that the initial partial pressure at 950° C. is within the range of 0.5 to 2.2 atmospheres.

Cylindrical electrical resistance furnace 15 is constructed so as to permit independent temperature control of each lengthwise half of the furnace core. For the most efficient operation the entire furnace is inclined about 1.8 inches per foot with the silicon cubes at the lowest point. Heating is then commenced in such fashion as to heat the silicon cubes at a temperature of 1100° C. while heating the other end of the tube at a temperature of 800° C. so producing a median temperature of approximately 950° C. The temperature gradient over the length of the tube with the exception of the space where the silicon cubes are located and at the 800° C. end, is about 40° C. per inch. However, it has been determined that most efficient operation can be attained by the use of a 1025–1095–1025° C. temperature gradient which is obtained by inserting quartz tube 12 in a horizontal Marshall cylindrical electric resistance furnace (provided with 18 external taps and being 24 inches in length). A mean temperature gradient of approximately 20° C. per inch is found to be an optimum for such gradient. Heating is continued for a time period within the range of 10 minutes to 20 hours. It will be appreciated by those skilled in the art that the noted maximum is not an absolute and variations appreciably beyond 20 hours may be made without any deleterious effects.

After the heating is concluded, the tube and its contents are permitted to cool to the ambient temperature and the resultant silicon ribbons removed and examined.

The resistivity of the source silicon is desirably maintained within the range of 0.001 to 0.005 ohm-centimeter. However, silicon sources having resistivities of the order of 2.0 ohm-centimeters and greater may be employed. Any appreciable variation at the lower end of the indicated range results in the formation of silicon needles (whiskers) rather than the desired ribbons.

The temperature of the arsenic-doped source silicon is preferably maintained at approximately 1095° C. However, variations over the range of 1050 to 1200° C. may be made without causing any deleterious effects. Further variation beyond the indicated minimum fails to result in ribbon growth whereas the maximum of 1200° C. is dictated by apparatus limitations. The reaction vessel is maintained at temperatures from 1050 to 1200° C. at the source end to about 800° C. at the other end, or, in the alternative, a 1025–1095–1025° C. gradient is employed in the Marshall furnace. The ribbon formation typically occurs in that portion of the tube which is at a temperature within the range of 1025–1075° C. in the latter whereas growth occurs in that portion of the tube maintained at about 950° C. in the apparatus described in FIG. 1.

The initial partial pressures of the hydrogen and the iodine at 950° C. must also be within the prescribed limits. It has been determined that the initial partial pressure of hydrogen ($P_{H_2}$) at 950° C. must be within the approximate range of 0.5 to 2.2 atmospheres, the upper limit being dictated by safety requirements for the particular apparatus employed, and the initial partial pressure of the iodine ($P_{I_2}$) at 950° C. must be maintained within the range of 1.76 to 3.1 atmospheres. Variations from these limits result in the formation of silicon whiskers or in a silicon film rather than the ribbon. However, it has been noted that even in the absence of hydrogen some ribbon growth occurs.

The duration of heating is generally within the range of 10 minutes to 20 hours. As the heating progresses more ribbons nucleate and those already present thicken (slightly).

An optimum has been determined to exist when arsenic or boron-doped silicon pellets having a resistivity of 0.002 ohm-centimeter are reacted with iodine and hydrogen maintained at an initial partial pressure of 2.3 and 2.2 atmospheres at 950° C., respectively, in a 1025–1095–1025° C. temperature gradient for one hour.

It has been determined that small quantities of elemental metals or the corresponding iodides of such metals are necessary to effect the process. After wide experimentation, those elements which have been found suitable for such purposes are nickel, copper, silver, cadmium and manganese as well as their corresponding iodide compounds. These materials are typically employed in amounts within the range of 0.001 to 0.3 percent by weight of the total iodine in the system in order to obtain practical yields. The use of less than the indicated amounts causes the formation of silicon whiskers rather than ribbons, whereas percentages appreciably greater than the indicated upper limit have no further effect on ribbon production.

The silicon ribbons grown in accordance with the present inventive technique are characteristically of uniform width (30 to 150 microns), varying length (1 to 20 millimeters) and of thickness within the range of 0.1 to 15 microns which vary stepwise along the ribbon length, although many blades and ribbons have been produced outside of these limits. Operation of the process for time periods outside the indicated range will result in thicker ribbons.

An Esaki diode utilizing a silicon ribbon prepared in accordance with the present invention is shown in FIG. 2. Diode 21 is fabricated on an n-type silicon having an impurity concentration of $4\times10^{19}$ atoms $cm.^{-3}$. Indium, with small additions of gallium is alloyed to the silicon in the form of a sphere 22 forming the p–n junction 23. The alloying is performed on a variac controlled strip heater utilizing an atmosphere of hydrogen which has been dehydrated by passage through a deoxo unit and a pair of liquid nitrogen traps. In order to eliminate cutting following the alloying cycle, the unit to be mounted is alloyed on a 40 mil square. The square is bonded directly to gold-plated leader 24 at a temperature of 425° C. After bonding, the temperature is lowered to approximately 200° C., a temperature at which the indium-gallium alloy is liquid and permits the embedding of a 1 mil gold wire therein. The other end of this lead is welded to one of the insulated posts 25 by means of a nickel sleeve 26.

Examples of the present invention are set forth below in tabular form. They are intended merely as illustrations, and it is to be appreciated that the process described may be varied by one skilled in the art without departing from the spirit and scope of the invention.

Each set of data set forth in Table I was obtained by inserting either arsenic or boron-doped silicon pellets, iodine pellets containing nickel diodide in the apparatus illustrated in FIG. 1 and operating the process in accordance with the following set of operating conditions with the source silicon maintained at 1100° C. for three hours and the colder end of the quartz tube maintained at 800° C. Example 10 in the table was performed by adding equal amounts of 0.002 ohm-centimeter boron-doped silicon and 0.002 ohm-centimeter arsenic-doped silicon cubes to the quartz tube shown in the apparatus of FIG. 1, and operating the process for one hour at the above conditions.

*Table I*

| Example | Resistivity of Source Silicon in ohm centimeter | Initial Partial Pressure of Iodine at 950° C. in atmospheres | Initial Partial Pressure of Hydrogen at 950° C. in atmospheres | Product |
|---|---|---|---|---|
| 1 | 0.001 | 2.3 | 1.1 | Silicon ribbons and needles. |
| 2 | 0.002 | 2.3 | 1.1 | Do. |
| 3 | 0.0025 | 2.3 | 0.54 | Do. |
| 4 | 0.005 | 2.3 | 1.1 | Silicon ribbons. |
| 5 | 1–2 | 2.3 | 1.1 | Do. |
| 6 | 0.002 | 2.1 | 1.1 | No transfer. |
| 7 | 0.002 | 2.3 | 0 | Si.icon film; no needles or ribbons. |
| 8 | 0.002 | 2.3 | 1.6 | Silicon globules; no ribbons. |
| 9 [1] | 0.002 | 2.3 | 0.54 | Silicon ribbons (thin and thick). |
| 10 | { 0.002 As<br>0.002 B } | 2.3 | 0.54 | Silicon ribbons. |
| 11 | 0.01 | 2.3 | 0.54 | Do. |
| 12 | 0.1 | 2.3 | 0.54 | Do. |

[1] Heated for 10 minutes at 1100° C.

Examination of the table reveals that variations from the defined ranges set forth above result in the absence of silicon ribbons and cause the production of a silicon film or needle. Thus, Examples 6 through 8 show variations in initial partial pressure of the iodine at 950° C., and initial partial pressure of hydrogen at 950° C., each variation causing the absence of ribbons in the resultant product. Example 10 reveals that silicon ribbons may also be produced in the system when the arsenic has been compensated with boron, a p-type impurity.

At the conclusion of each transport reaction, a small quantity of a white solid is formed at the colder end of the tube during cooling. Chemical analysis of the solid revealed that it was silicon tetraiodide, thus indicating that this compound was involved in the transport of silicon in the reaction vessel.

Further data set forth in Table II was obtained by inserting arsenic-doped silicon pellets having a resistivity of 0.0018 ohm-centimeter, iodine pellets and 0.002 percent of the indicated iodide based on the total weight of the iodine in the system in the apparatus illustrated in FIG. 1. The process was operated with the source silicon maintained at 1100° C. for one hour and the colder end of the vessel maintained at 800° C. with an initial partial pressure of iodine at 950° C. of 2.3 atmospheres and an initial partial pressure of hydrogen at 950° C. of 0.54 atmosphere.

*Table II*

| Example | Iodide Added | Product |
|---|---|---|
| 1 | $NiI_2$ | Silicon ribbons. |
| 2 | $FeI_2$ | Wall nodules—no ribbons. |
| 3 | $MnI_2$ | Silicon ribbons. |
| 4 | CuI | Do. |
| 5 | AgI | Silicon ribbons—wall nodules. |
| 6 | $ZnI_2$ | Wall nodules—no ribbons. |
| 7 | None | Do. |
| 8 [1] | $CoBr_2$ | Do. |
| 9 | $CdI_2$ | Wall nodules—silicon ribbons. |
| 10 | $MgI_2$ | Wall nodules—no ribbons. |

[1] Cobalt bromide added.

Examination of Table II reveals that the presence of the indicated quantities of nickel, manganese, copper, silver and cadmium iodides produce the desired result whereas the iodides of iron, zinc and magnesium and cobalt bromide are ineffective.

Further data set forth in Table III was obtained by inserting either arsenic or boron-doped silicon pellets of varying resistivities and iodine pellets containing nickel diiodide in the apparatus described above and operating the process in accordance with the indicated operating conditions.

skilled in the art are all considered within the broad scope of this invention, reference being had to the appended claims.

What is claimed is:

1. A method for the preparation of silicon ribbons which comprises reacting a pellet selected from the group consisting of arsenic-doped silicon and boron-doped silicon, having a resistivity within the range of 0.001–2.0 ohm-centimeters, at a temperature within the range of 1050–1200° C. in a reaction vessel having a temperature gradient ranging down to about 800° C., said gradient being within the range of approximately 20–40° C. per inch, in the presence of iodine maintained at an initial partial pressure within the range of 1.76–3.1 atmospheres at 950° C., at least one iodide selected from the group consisting of nickel diiodide, copper diiodide, manganese iodide, silver iodide and cadmium diiodide in an amount within the range of 0.001 to 0.3 percent by weight of total iodine, and hydrogen maintained at an initial partial pressure within the range of 0.5–2.2 atmospheres at 950° C. for a time period within the range of 10 minutes to 20 hours.

2. A method in accordance with the procedure of claim 1 wherein said diiodide is nickel iodide.

3. A method in accordance with the procedure of claim 1 wherein said pellet has a resistivity within the range of 0.001–0.005 ohm-centimeter.

4. A method in accordance with the procedure of claim 1 wherein said pellet is arsenic-doped silicon.

5. A method in accordance with the procedure of claim 1 wherein said pellet is boron-doped silicon.

6. A method in accordance with claim 1 wherein said temperature gradient ranges from 1095° C. down to 1025° C.

*Table III*

| Example | Resistivity of Source Silicon in ohm-cm. | Ni Added to Iodine, Percent | Temp. of Source Silicon | Temp. of colder end of tube | Duration of heating in hours | Initial Partial Pressure of Iodine at 950° C. in atm. | Initial Partial Pressure of Hydrogen at 950° C. in atm. | Product |
|---|---|---|---|---|---|---|---|---|
| 1 | 0.0022 As doped | 0.027 | 1,095 | 1,025 | 6 | 1.7 | 0.54 | Many short and long transparent ribbons. |
| 2 | 0.0018 As doped | 0.027 | 1,095 | 950 | 20 | 1.7 | 0.54 | Many long narrow transparent ribbons. |
| 3 | 0.0024 As doped | 0.052 | 1,095 | 1,025 | 6 | 1.8 | 0 | Small transparent ribbons at both ends of tube. |
| 4 | 0.0010 As doped | 0.20 | 1,095 | 915 | 23.5 | 2.3 | 2.2 | Heavy and transparent ribbons. |
| 5 | 0.0016 B doped | 0.20 | 1,095 | 1,025 | 2 | 2.3 | 2.2 | Thin transparent ribbons and some fine needles. |

The data of the table illustrate that variations within the described ranges in partial pressures of hydrogen and iodine, duration of heating and temperature gradient still result in the formation of silicon ribbons. Further, it is noted that hydrogen need not be present (Example 3) to obtain ribbon growth, however, for practical purposes its presence is preferred.

While the invention has been described in detail in the foregoing description and the drawing similarly illustrates the same, the aforesaid is by way of illustration only and is not restrictive in character. The several modifications which readily suggest themselves to persons

References Cited in the file of this patent

Journal of the Electrochemical Society, March 1959, pages 238–244.

IBM Journal of Research and Development (I), vol. 4, No. 3, July 1960, pages 299–301.

IBM Journal of Research and Development (II), vol. 4, No. 3, July 1960, pages 288–295.

Metallurgy of Elemental and Compound Semiconductors, Interscience Publishers, New York, vol. 12; papers given in Boston, Mass., August 29–31, 1960, pages 86–91 and 229–251.